US008491061B2

(12) United States Patent
Breault

(10) Patent No.: US 8,491,061 B2
(45) Date of Patent: Jul. 23, 2013

(54) SYSTEM FOR SPRAYING WATER TO REDUCE DUST WHILE DRILLING IN A MINE TUNNEL

(76) Inventor: Michel Bernard Breault, Amherstburg (CA)

( * ) Notice: Subject to any disclaimer, the term of this patent is extended or adjusted under 35 U.S.C. 154(b) by 158 days.

(21) Appl. No.: 13/317,390

(22) Filed: Oct. 17, 2011

(65) Prior Publication Data

US 2013/0092757 A1 Apr. 18, 2013

(51) Int. Cl.
*E21F 5/02* (2006.01)

(52) U.S. Cl.
USPC .................................. 299/12; 299/95; 248/75

(58) Field of Classification Search
USPC ...................... 299/12, 95; 248/75, 76, 77, 78
See application file for complete search history.

(56) References Cited

U.S. PATENT DOCUMENTS 1,942,701 A * 1/1934 Hilton ............................ 248/75
2,453,248 A * 11/1948 Much ............................ 248/75
2,464,958 A * 3/1949 Allen ............................ 248/75
3,119,587 A * 1/1964 Anderson ...................... 248/75

FOREIGN PATENT DOCUMENTS

JP 2009-150139 A * 7/2009

* cited by examiner

*Primary Examiner* — John Kreck
(74) *Attorney, Agent, or Firm* — Bernard J. Cantor

(57) ABSTRACT

A system for reducing ambient dust during drilling in a mine tunnel comprising securing a wire mesh upon the tunnel wall at the work area and temporarily suspending an attachment plate upon the wire mesh by hooks and a depending springy cable. A horizontally extending, rotatable arm having a rotatable clamp on its end is connected to the plate. The clamp holds the end of a water spray hose which may be manually directed to spray water on debris at the work area to reduce dust from the. debris/ The attachment my be moved from place to place along the tunnel wall and the waters spray redirected accordingly.

11 Claims, 4 Drawing Sheets

12
10
21
19
21
16
14
15
26
60
45
17
35
18
39
20
28
13
54
27
37
25
14
41
13
56
13
58
13
11

21
16
3
12
3
34
26
45
40
35
39
32
37
16
41
27
43
54
25

13
56

SYSTEM FOR SPRAYING WATER TO REDUCE DUST WHILE DRILLING IN A MINE TUNNEL

BACKGROUND OF INVENTION

This invention relates to a system and equipment for reducing and controlling dust accumulation in the working area where drilling or blasting occurs in forming an underground mine or mine-like tunnel. During a conventional mining operation, such as digging a tunnel or shaft for removing ore or coal or digging a tunnel for passage through a mountain considerable quantities of dust may be produced in the area of the drilling operation. The dust accumulation in the air can be hazardous to the miners or workmen in the tunnel, block visibility in the work area, and otherwise interfere with the tunnel digging work.

In typical mining operations, blasting or drilling the end of a tunnel produces large quantities of "muck" or debris. Dust tends to settle in this muck. Thus, when the muck is removed by shoveling or scooping, the disturbance creates dust from the muck. The dust "tends to form" a dense "cloud" in the working area.

In the past, some efforts have been made to reduce or control the dust accumulation in the work or drilling area by providing a water supply hose and a workman to manipulate and control the hose for spraying the area and the muck with water to settle the dust. This task of manipulating a water hose to spray the drilling area or other collections of muck carrying dust is difficult and can become hazardous, particularly where it is necessary for the workman who is handling the hose to be exposed within a dusty area for a relatively long time. Moreover, it is inefficient to use a skilled miner, who otherwise would be involved in the digging or drilling or blasting operation, to spend time manipulating the hose for dispersing any particular dust accumulation.

Since the immediate digging site typically includes equipment and people, a spray hose which is not hand-held may be contacted, or knocked over, by the moving equipment or miners. Hence, the present invention involves a system and equipment which can provide directed sprays in the dusty work area with little labor or effort and without the need for a workman holding or manipulating a water hose. This invention is concerned with providing a way of manually, temporarily positioning and directing a water hose spray within the mine tunnel drilling area in a way that the hose cannot be accidentally displaced or damaged and does not require hand-holding, and wherein the hose may be quickly and easily, without tools, manually moved to, and held at, different locations as needed, by minimal labor.

SUMMARY OF INVENTION

This section provides a general summary of the disclosure of this invention, and is not a comprehensive disclosure of its full scope or all of its features.

In some mining operations, a wire mesh, formed of spaced apart vertical and horizontal wires, is fastened upon the walls of the mine tunnel to hold back and protect against small pieces of rock or the like falling down within the tunnel. The invention herein contemplates providing an attachment which temporarily can be quickly, easily and without tools, secured upon such mesh wires at the work or drilling site within the mine tunnel. The attachment is formed of a plate having hooks from which the plate may be suspended from the mesh wire with a resilient or springy cable temporarily locking the plate to the mesh.

An outwardly extending, preferably U-shaped arm is connected to the plate by means of a threaded shaft that engages the plate and the base of the arm. Thus, the arm may be turned or rotated around a horizontal axis and, thereby, angularly adjusted relative to the plate. Preferably a locking nut arrangement is provided to lock the desired angular position of the arm relative to the plate.

The free ends of the arm hold a hose clamp which is rotatable about a vertical axis. The nozzle portion of a spray hose is held in the clamp. The clamp may be rotated about an axis transverse to the arm. Consequently, the hose nozzle may be manually arranged at a pre-selected distance from the plate and at a pre-selected angle relative to horizontal. With this arrangement, no manual care is needed once the plate is suspended from the mesh and the angle of the spray and its position in the work area may be quickly changed as desired.

Moreover, the danger of the plate being disconnected from the mesh or otherwise moved from its pre-set position, is eliminated by the flexible, and, preferably, resilient or springy cable which temporarily pulls the plate downwards to hold the plate hooks on the mesh wire. Thus, in the event the plate is accidentally contacted by equipment or a person, it will not pull free from its position on the mesh.

The plate suspension and the resilient cable arrangement cable and the adjustments of the hose nozzle resulting from the adjustability of the arm relative to the plate and clamp, makes it possible to rapidly lock the plate on pre-selected places within the tunnel work area for whatever time needed. Then the attachment may be quickly removed and placed in a different location with minimal labor and no tools.

An object of this invention is to provide a system by which a controlled or directed water spray may be provided in the drill or digging area of muck accumulation area of a mine tunnel for reducing the ambient dust accumulation in that area without requiring more than momentary attention by a miner who can otherwise be occupied in the drilling or removal of the "muck" or debris at the work area.

A further object is to provide an attachment which can be quickly arranged in, and removed from, a particular location at the drill site without tools, with little effort, and quickly and easily manipulated for directing the spray from a water hose for reducing and settling ambient dust.

Still another objective of this invention is to provide a simple, inexpensive attachment which can utilize an available mesh or similar wall protective coating for placement at a mine drill site and which is easily moveable from place to place within the site, which is temporarily locked in place, so that is protected against damage or displacement by accidental contact with equipment or mining personnel.

It is further an object to provide equipment which is extremely inexpensive, easily operable, and easily manipulated for aiming spraying water as desired on a temporary basis to control or reduce accumulated dust at the mine drill site.

These and other objects and advantages will become apparent upon reading the following description, of which the attached drawings form a part.

DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The system will now be described more fully with reference to the accompanying drawings.

Figure 1:
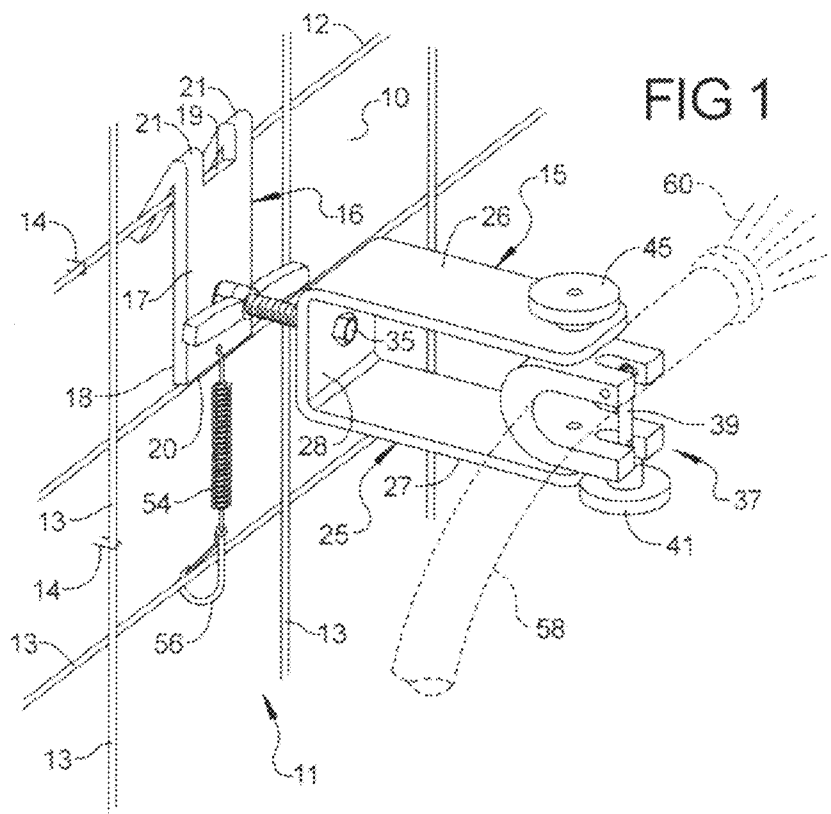
FIG. 1 is a perspective, schematic, view of the system, including the attachment mounted upon the wall of a mine-like tunnel and a water spray hose positioned within the attachment.
Figure 2:
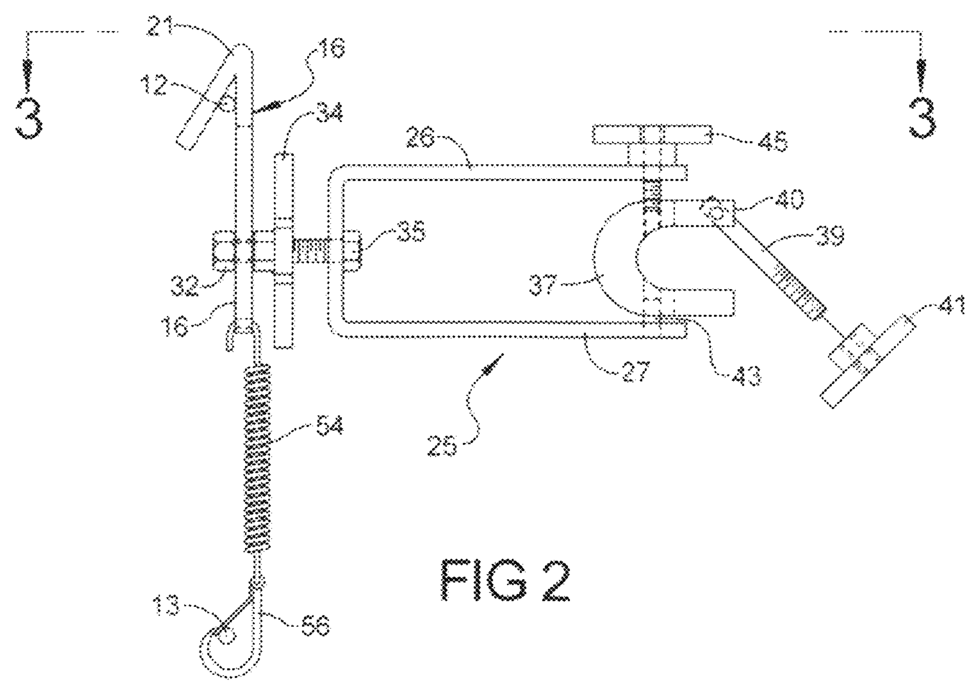
FIG. 2 is a side elevational view of the attachment.
Figure 3:
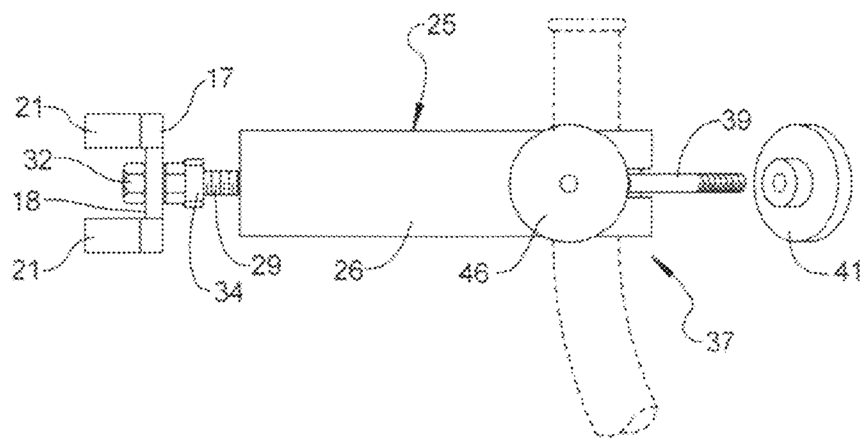
FIG. 3 is a top, plan view taken in the arrow 3-3 of FIG. 2.
Figure 4:
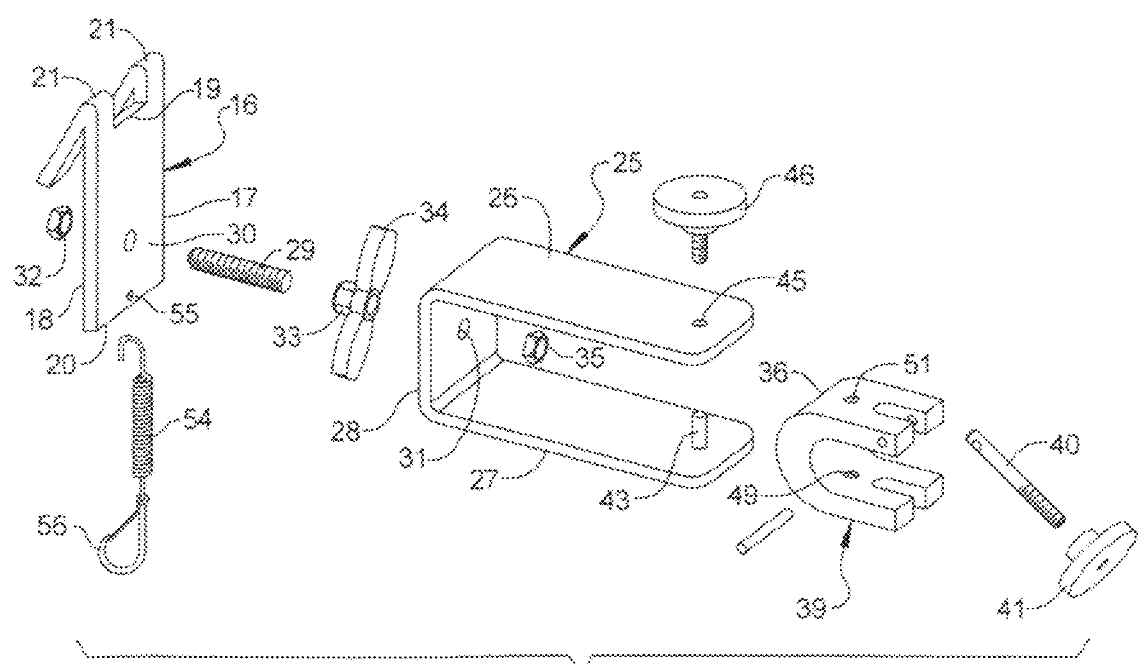
FIG. 4 is a perspective, exploded view of the attachment showing the parts in their relationship prior to assembly.
Figure 5:
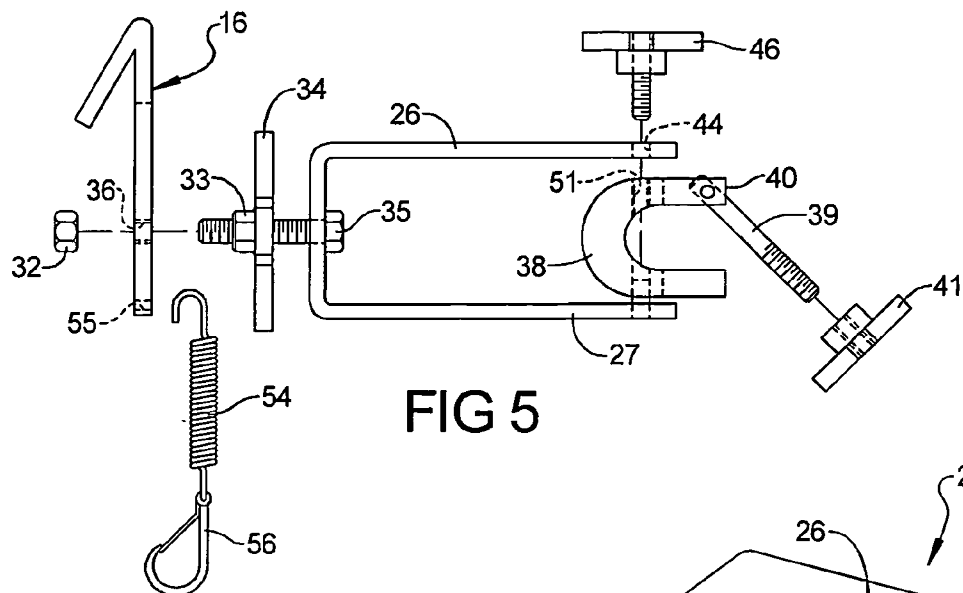
FIG. 5 is a side elevational view showing the disassembled plate and arm parts.
Figure 6:
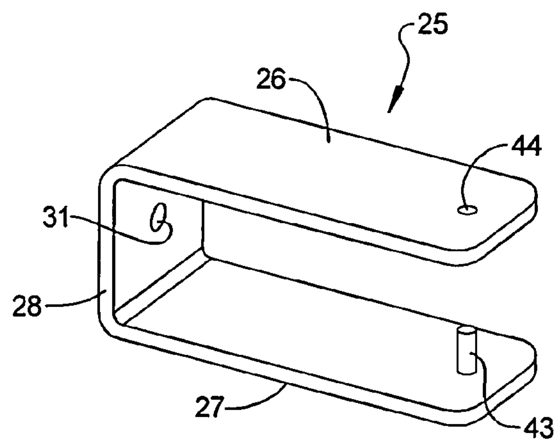
FIG. 6 is a side view of the arm of the attachment.
Figure 7:
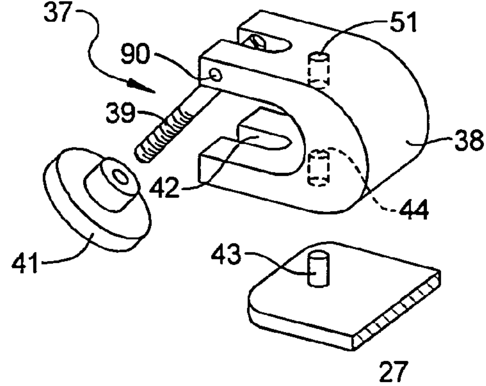
FIG. 7 is an enlarged fragmentary view showing the clamp on the end of the attachment arm.
Figure 8:
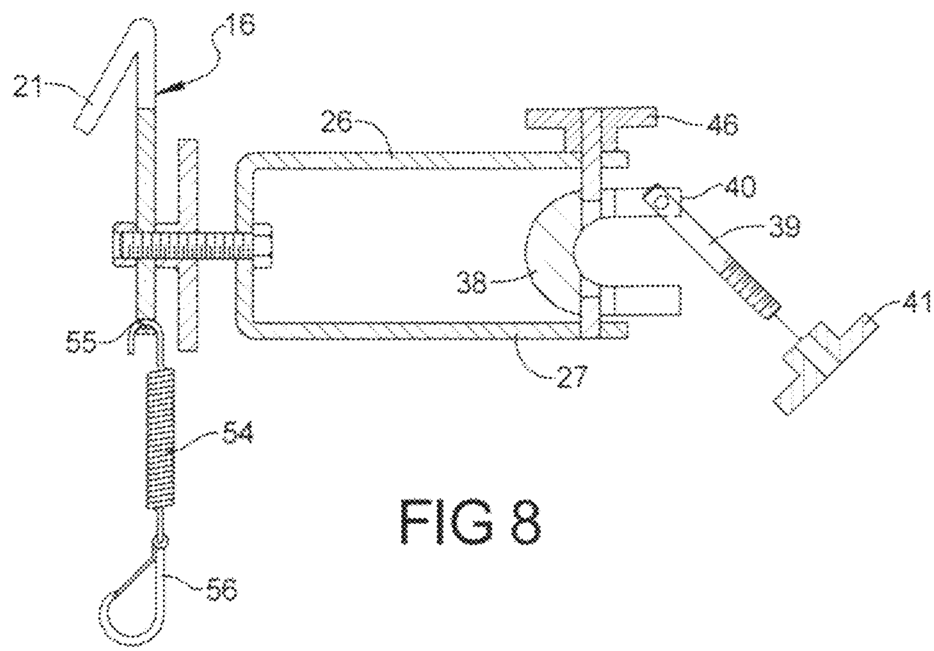
FIG. 8 is an enlarged view of the attachment shown in cross-section.
Figure 9:
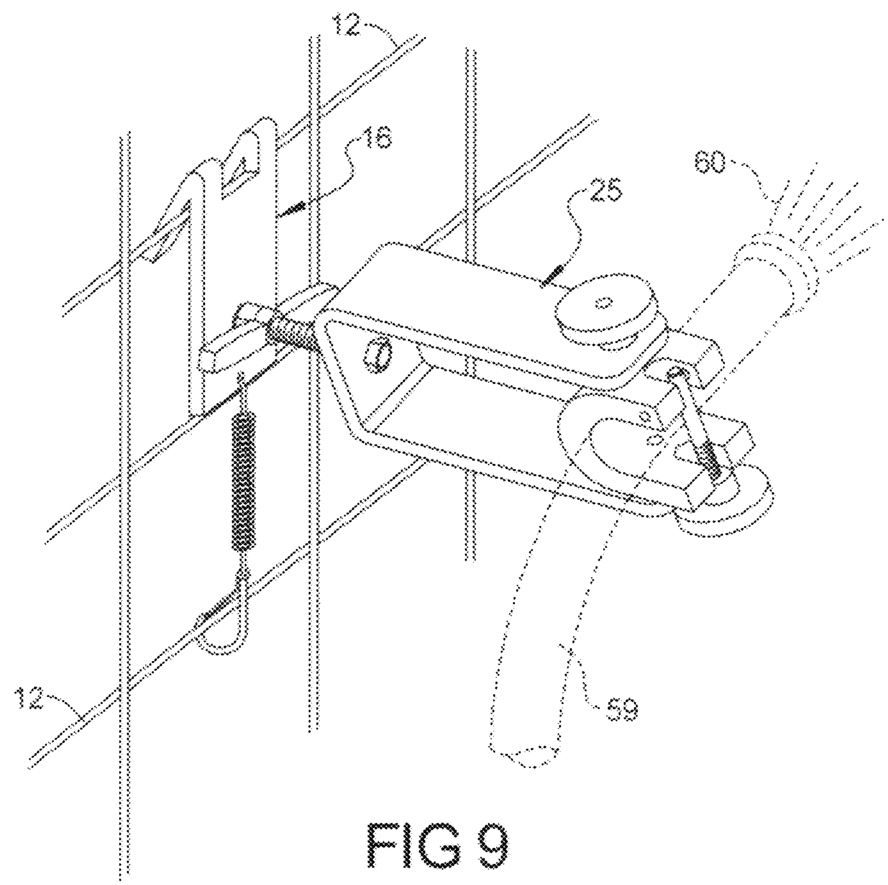
FIG. 9 schematically shows the attachment turned relative to the plate to illustrate the angularity adjustment.

FIG. 1 schematically illustrates a mine tunnel wall 10 upon which a wire mesh 11 has been secured. The mesh is formed with spaced apart horizontal wire strands 12 and vertical wire strands 13 that are joined together. For example, there may be four-inch spaces between adjacent wires in a vertical and horizontal direction. The wires may be of any suitable size such as, for example, one-quarter inch or more in diameter. Such wire mesh constructions are commercially available. The mesh may be secured to the walls of the tunnel by suitable fastening bolts or screws or staples 14 or other commercially available fasteners that are utilized in mines for fastening such mesh materials to the walls of the tunnel in places where desired.

The attachment 15 is formed with a base plate 16 which is normally substantially vertically arranged when in use. The plate has a front face 17, a rear face 18, an upper edge 19 with a lower edge 20. Hooks 21 are formed on the plate upper edge 17, as by bending the upper portions of the plate or by welding hooks upon the plate for suspending the plate from the mesh wires.

A U-shaped arm 25 extends forwardly from the plate. The arm is provided with an upper part 26, a lower part 27 and a base 28.

The arm is secured to the base plate 16 by a threaded shaft 29. One end of the shaft is threadedly engaged with a threaded hole 30 in the base plate 16. The opposite end of the shaft is engaged within a hole 31 in the arm base 28. Preferably a locknut or lock washer or welded head 32 is formed on the free end of the threaded shaft on the rear face of the base plate 16. That prevents the threaded shaft from being accidentally unscrewed or disengaged from the plate. For ease in assembly and disassembly of the attachment, the nut may be used or a lock washer. Where disassembly is not needed, a headed formation can be welded onto the free end of the threaded shaft to prevent unscrewing the shaft from the plate.

The forward end of the shaft extends into the hole 31 of base 28 of the arm. The end of the shaft can be welded to the base or secured by a lock nut. Thus, the arm and the shaft form a rigid unit. However, the assembly of the shaft can be reversed. That is, the shaft can be welded to the plate and threadedly engaged in hole 31.

A locking nut 33 is mounted on the threaded shaft 29. Radially outwardly extending handles 34 are attached to the locking nut for manually rotating the nut towards or away from contact with the face of plate 16. When the locking nut contacts the plate, it fixes the distance between the plate and the base of the arm. It also fixes the angular position of the arm; that is the degree of rotation of the arm relative to the horizontal axis of the arm. Hence, that angular rotational position can be manually adjusted by rotating the arm, after backing the nut a short distance from the plate and then advancing the nut into contact with the plate to fix the selected angular position of the arm.

This enables the plate to be arranged on the mesh statically while the arm may be manually turned to angularly adjust the angle of the hose nozzle that is carried by the arm by simply moving the handles 34 to force the locknut 33 away from, and then against the front face of the plate. Where the shaft end is welded to, or fixed to, or immovable, fixed by a locking nut 35, to the base of the arm, manually turning or rotating the arm when the locknut 33 is threaded away from the base plate enables fine angular adjustments. Then moving the handles reversely fixes the angle, without tools, by again forcing the locknut 33 against the plate surface.

The free ends of the parts 26 and 27 of the arm support, between them, a clamp 37 which is formed with a C-shaped holder 38 part and a clamp rod 39. The rod is secured to the C-shape by a pivot 40. When the rod is pivoted into a slot 42 in the C-shape holder, a fastening nut 41 locks it in place to clamp a hose within the C-shape holder.

The C-shape holder is mounted upon a stud 43 located on the free end of the lower arm 27. The stud fits into a hole 44 in the holder. A hole 43 in the lower part 27 receives a thumb screw 46 that extends through a hole 43 in the upper part 26 of the arm and into a threaded hole 51 in top of the C-shaped holder for locking the holder in angular positions relative to the arm. Thus, the holder swivels about a roughly vertical axis. Hence, when the hose is not in use, the nozzle can be swung into the space between the arm parts and base for protecting the nozzle.

A flexible cable or line 54, having an upper end attached within a hole 55 in the lower portion of the plate, depends beneath the plate. The lower, dew end of the cable is provided with a clip 60, such as a conventional spring clip, for fastening the cable or line to the mesh at a point beneath the plate. Hence, should the plate be knocked free of the mesh, the cable or line will prevent it from falling to the ground and prevent it from being damaged. Preferably, the cable is made of a flexible, resilient coil spring or a link chain having a resilient link portion or an other suitable elastic line.

In normal operation, the wire mesh is first installed in the area where the digging progresses. Then the attachment is hung from a horizontal wire of the mesh. Once the attachment is hooked in place, the clip on the end of the depending cable or line is hooked to the mesh wire beneath the plate. The resilient cable applies a tension or downward force on the plate which locks it to the mesh. In the event not a complete wire is available, it may be hung from a horizontal wire fastened by bolts or screws in the wall or a horizontal strip of metal bolted to the wall and the cable is attached to a similar wire or strip arranged beneath the plate and to tightly hold the hooks upon the wire portion upon which they are suspended. Then the hose is applied to the attachment.

The hose 58 has a nozzle end 59 of the type which will spray water 60 from the nozzle into the tunnel work area. The angle of the spray and the direction of the spray and its distance from the wall upon which the plate is hung, can be adjusted by the workmen. After some use, the attachment may be unhooked and placed in a different location within the work area. Because the attachment is compact, out of the way of the workmen and of their equipment, the miners may dig in the area, removing the "muck" or debris while the spray is continuously in operation as needed. Hence, no manual attention or care is needed once the spray is adjusted and turned on until it is desired to move the spray to a different location. If the attachment or hose end is inadvertently contacted, the springy cable enables the plate to move slightly but to still spring back to its initial place.

The parts making up the attachment may be selected by those skilled in the art of suitable metal and sizes and shapes and metal materials to permit use within the environment of a mine or underground tunnel and in moisture-laden air and to resist rusting or other deterioration of the parts.

The foregoing description is for an operative embodiment and best mode known to the inventor herein. Thus, having described at least one operative embodiment, it is desirable that the foregoing description be read as being merely illustrative and not in a strictly limiting sense. I know claim:

What is claimed is:

1. A system for providing a temporary, moveable, water spray within the digging area of an underground mine-like tunnel for reducing and settling dust accumulation resulting from the digging work and in which a wall covering material is provided at the work area comprising an attachment for temporarily mounting a water spray hose on the wall covering for directing water spray within the area, comprising:

a generally vertically arranged base plate having an upper end with a hook portion for engaging with the wall covering material and exposed forward face;

an elongated arm extending forwardly of the plate, with the arm having an end rotatably connected to the plate for adjusting the angle of the arm around its central axis;

the arm having a free end upon which a clamp is mounted for receiving and holding the nozzle end of a spray hose;

the arm being connected to the plate by a horizontal threaded shaft threadedly connected within a threaded opening to the plate at one end and connected to the arm at its opposite end with the arm being manually rotatable with the shaft for changing the angularity of the arm relative to the plate and for increasing or decreasing the distance between the arm and the plate and thereby positioning the clamp closer to or further from the plate, whereby water may be sprayed through a hose at a preselected direction by adjusting the angularity of the arm and the distance from the plate of the clamp, for wetting and disbursing accumulated dust in the work area.

2. A system as described in claim 1 and including said arm being formed in a U-shape with a base part and generally parallel elongated arm parts spaced apart and extending horizontally from the base;

said shaft being connected with the base part of the arm for connecting the arm to the plate; and said clamp being held between the adjacent free ends of the two parts forming the arm and being angularly adjustable and pivotal about a vertical axis within the space between the two parts for adjusting the angularity of the hose portion clamped therein.

3. A system as defined in claim 2 and including a flexible, resilient line connected to the plate and having a releasable connection member for connecting the free end of the line to the wall covering beneath the plate and applying a downwardly directed force to tightly engage the plate hook portions with the wall covering for thereby holding the attachment upon the wall covering in the event the plate becomes detached from the wall covering.

4. A system as defined in claim 3 and including the wall covering being in the form of a wire mesh material having spaced apart horizontal and vertical wires with the plate hooks engaged over a preselected horizontal wire and the line connection member being connected to a lower horizontal wire.

5. A moveable attachment for temporarily supporting the nozzle end of a water spray hose upon a wire wall covering material arranged generally at the digging work area of a mining-like tunnel wherein quantities of dust are generated in the area, comprising:

a normally vertically arranged flat plate having hooks formed on an upper end for temporarily hooking over and being suspended from a horizontally arranged wire of the wall covering mesh, a generally U-shaped elongated arm extending laterally forwardly of the plate into the work area, with the base of the U-shape arm being connected to the plate;

the connection between the plate and the arm being provided by a threaded shaft having one end threadedly engaged within a threaded opening in the plate and an opposite end engaged within an opening in the base of the arm so that the arm may be rotated about a horizontal axis relative to the plate and may be adjustably moved toward and away from the plate by the threaded engagement therebetween;

a clamp having an openable portion mounted between the free ends of the parts forming the legs of the U-shaped arm with the clamp being rotatable about a substantially vertical axis and the clamp being shaped to grip and hold an end portion of a water-dispensing hose;

a lock member mounted on the shaft for locking a preselected location during rotation of the arm relative to the plate for manually fixing a pre-selected angular position of the arm, whereby the attachment may be mounted temporarily in the work area of a mine-like tunnel and be manually adjusted angularly and the arm and clamp may be moved closer to, or further from, the plate and the wall upon which the plate is temporarily positioned for directing a water spray from the water hose into the tunnel area for wetting and settling dust in the area.

6. An attachment as defined in claim 5 and including said hook portion being formed to closely fit over and receive a horizontal wire forming a part of said wall covering and a flexible, resilient cable having an upper end connected to the plate and a lower end formed with a manually attachable and detachable clip for connecting the cable to the wall covering for applying a downwardly directed force on the plate to pull the hook portion downwardly on the wire with which the hook portion is engaged and to protect the plate from disengaging from the wire in the event of accidental contacts.

7. An attachment as described in claim 6 and including said cable being formed of an elongated coil spring which resiliently connects the plate to the wall covering at a distance from the plate for protecting the plate against damage or disengagement from the wall covering.

8. A method for providing a temporary water spray within the mine working or digging area of a mine-like tunnel for wetting muck containing dust and settling ambient dust accumulated in that area comprising:

attaching a base plate temporarily on a wall covering mesh applied upon the wall defining the work area at a predetermined location;

providing a horizontal arm rotatably secured to the base plate for rotation above the axis of the arm and extending the arm horizontally into the workspace;

clamping a water spray hose to the free end of the arm;

manually adjusting the position of the arm angularly relative to the horizontal axis of the arm and, if desired, longitudinally towards and away from the plate, and temporarily fixing such position;

providing a clamp on the free end of the arm for holding the end of a water spray hose; and attaching the hose to the clamp.

whereby water may be sprayed in a predetermined direction through the hose, relative to the plate and the wall upon which the plate is mounted for wetting and disbursing dust within the area of work.

9. A method as defined in claim 8 above and including connecting the arm to the plate with a threaded shaft which is threadedly engaged within a threaded hole in either the plate or the arm and rigidly engaged with the other of the plate or arm and rotating the shaft to position the arm at a preselected angle, and fixing the angle of the rotation temporarily for directing water spray from a hose held by the arm.

10. A method as defined in claim 9 above and including providing a resilient, flexible cable connecting the plate to the wall covering below the plate, connecting the upper end of the plate to the wall covering by means of hooks engaging a horizontal arranged wire-like strip on the wall covering placed upon the wall.

11. A method as defined in claim 9 and forming the wall covering out of a wire mesh made of spaced apart horizontal and vertical wires;

providing hooks on the upper end of the plate and suspending the plate from the mesh by engaging the hooks over a horizontal wire portion of the mesh;

providing an elongated resilient cable having an upper end temporarily attached to a portion of the mesh wire beneath the plate and exerting a downwardly directed springy force on the plate to tightly engage and hold the hooks upon the wire portion upon which they are suspended.

* * * * *